United States Patent [19]

Arai et al.

[11] Patent Number: 4,543,396

[45] Date of Patent: Sep. 24, 1985

[54] METHOD OF MAKING HEAT-RESISTANT POLYESTER WITH PHENYLENE-BIS-OXAZOLINE

[75] Inventors: Yoshihiro Arai, Joyo; Takumi Tanaka, Uji, both of Japan

[73] Assignee: Unitika Limited, Osaka, Japan

[21] Appl. No.: 643,909

[22] Filed: Aug. 24, 1984

[30] Foreign Application Priority Data

Oct. 3, 1983 [JP] Japan .................................. 58-185655

[51] Int. Cl.$^4$ ..................... C08F 283/00; C08G 63/76
[52] U.S. Cl. ..................................... 525/440; 528/289
[58] Field of Search ......................... 525/440; 528/289

[56] References Cited

U.S. PATENT DOCUMENTS

| | | | |
|---|---|---|---|
| 3,959,215 | 5/1976 | Schneider | 525/440 X |
| 4,138,545 | 2/1976 | Emmons et al. | 528/289 |
| 4,291,152 | 9/1981 | Inata et al. | 528/289 |
| 4,331,800 | 5/1982 | Inata et al. | 528/289 |
| 4,351,936 | 9/1982 | Matsumura et al. | 528/289 |

*Primary Examiner*—Lucille M. Phynes
*Attorney, Agent, or Firm*—Richard A. Anderson

[57] ABSTRACT

This invention is a method of making heat-resistant polyester, the method being characterized by reacting the polyester consisting of aromatic dicarboxylic acid and the glycol component of 2-6 carbons and being in the molten state with 0.1-5 weight percent of molten 2,2'-1,3-phenylene-bis(2-oxazoline) to reduce the amount of end carboxyl group in the polyester to below 15 g equivalents per $10^6$ g of the polymer.

2 Claims, No Drawings

METHOD OF MAKING HEAT-RESISTANT POLYESTER WITH PHENYLENE-BIS-OXAZOLINE

BACKGROUND OF THE INVENTION

This invention is related to the method of making heat-resistant polyester of high degree of polymerization with reduced end carboxyl group (hereinafter this is written as COOH).

Various methods of reducing COOH of polyester have been proposed. Recently the method of reacting polyester and bis-oxazoline compound has attracted attention.

For example, Kokai JP No. 59525 - 1975 proposed the method in which phenylenebisoxazoline compound was added to the polyester before spinning. It was said that use of this method reduces the COOH of polyester, gives the effect of increasing the molecular weight and offsets at least a part of the decomposition which occurs at the time of spinning.

However, in this method, the melt spinning is done after adding the powder of bisoxazoline compound to the polyester chips; thus, it adds a process of solidifying the polyester and making chips. In addition, the remelting causes the decomposition of polyester and this is not offset sufficiently, resulting in some reduction in the molecular weight and insufficient effect of reducing the COOH.

SUMMARY OF THE INVENTION

The present inventors have discovered that a very good result can be obtained by selecting 2,2'-1,3-phenylene-bis(2-oxazoline) (this will be called 1,3-PBO) as the bisoxazoline compound and adding and reacting the molten 1,3-PBO to the molten polyester; thus, this invention was achieved.

In other words, the key point of this invention is the method of making heat-resistant polyester, the method being characterized by reacting the molten polyester consisting of aromatic dicarboxylic acid and the glycol component of 2–6 carbons with 0.1–5 weight percent of molten 1,3-PBO to reduce the COOH of the polyester to below 15 g equivalents per $10^6$ g of the polymer.

In this invention, polyester means the condensation polymer of aromatic dicarboxylic acid and glycol of 2–6 carbons and there is no special restriction on its types. It can be either a homopolymer or a copolymer. As for the method of condensation polymerization of the polyester, one can use the known methods without changes.

Amount of adding 1,3-PBO which is used in this invention is 0.1–5 weight percent with respect to the polyester. When this amount is too small, degree of blocking the COOH is low; reversely, if it is too much, reaction would proceed sufficiently but undesirable problems occur such as the decomposition of unreacted 1,3-PBO and abnormal rise of the viscosity of polyester.

The reaction between the polyester and 1,3-PBO is carried out by adding the molten 1,3-PBO after the intrinsic viscosity of polyester reaches 0.50 in molten state at the temperature above the melting temperature of the polyester and taking more than three minutes. The intrinsic viscosity here refers to the value as measured at 20° C. in phenol/tetrachloroethane (1/1 weight ratio). At the time of reaction, it is naturally necessary that the system is filled with an inert gas atmosphere such as nitrogen gas or that the system is barred from the active gas such as oxygen which accelerates the decomposition of polyester. Also, the reaction should be carried out under stirring. The molten 1,3-PBO may be added and mixed before the polycondensation of polyester is completed or it may be added and mixed to the polyester in the molten state after the completion of polymerization prior to the melt spinning. The reaction would proceed without a catalyst but a desirable catalyst may be used.

Thus, in this invention, the molten 1,3-PBO is added and reacted with the molten polyester and, consequently, the processes of solidification and remelting of the polyester can be saved. At the same time, the decomposition due to the remelting is eliminated, making the reaction go smoothly and enabling one to obtain the polyester of good heat resistance and of high degree of polymerization.

Also, it is of course possible to add other additives for other purposes to the polyester in obtaining the polyester of this invention.

Final form of the polyester in this invention may be fiber, film, or other shaped products.

The polyester of reduced COOH as obtained in this invention has improved heat stability, i.e., improved resistance to the hydrolysis or aminolysis at high temperature. This makes the upgrading of performance in the conventional application and optimization of process possible and also makes it possible to use in the areas where it could not be used in the past. Thus, the improvement in the practical value is remarkable.

In the following, we explain the invention more specifically by use of the examples of application.

DESCRIPTION OF THE PREFERRED EMBODIMENT

EXAMPLE 1

To the esterification product obtained by the esterification of terephthalic acid and ethylene glycol by the common method, 0.03 weight percent of antimony trioxide was added. Then at 280° C., one hour was required for reaching 0.1 torr from the atmospheric pressure. After this, under the high vacuum of 0.1 torr, reaction was continued for five hours under stirring to obtain the polyethylene terephthalate (hereinafter this is called PET) of intrinsic viscosity 0.90 and COOH of 24 g equivalents per $10^6$ g of the polymer. At the connecting tube between the polymerization reactor and the extruder-type melt spinning machine, an injection tube was installed as a branched tube. In the connecting tube after the injection tube, static mixing elements were installed. The injection tube was heated to 180°–200° C. and 1,3-PBO of melting point 146°–150° C. was melted and added from the injection tube to the polyester by 0.75 weight percent. The molten mixture of PET and 1,3-PBO underwent the reaction while passing through the connecting tube and reached the extruder-type melt spinning machine where it was spun under the conditions of melt temperature at 295° C., melting time about ten minutes, spinning speed 500 m/min. The undrawn yarn obtained was drawn in two stages over a 230° C. heated plate and a 220° C. heated roller to a total draw ratio of 6.2. This was taken up at a speed of 200 m/min as a PET yarn of 1500 denier/192 filaments. Intrinsic viscosity of the drawn yarn obtained was 0.92 and COOH was 8 g equivalent per $10^6$ g of the polymer.

The drawn yarn obtained by the same processes except for the addition of 1,3-PBO had an intrinsic viscosity of 0.84 and COOH of 30 g equivalents per $10^6$ g of the polymer.

COMPARATIVE EXAMPLE 1

Drawn yarn was obtained by repeating the same processes of the example of application except for using the 2,2'-1,4-phenylene-bis-(2-oxazoline) (hereinafter this is called 1,4-PBO) of melting point 249° C. in place of the 1,3-PBO and keeping the heating temperature of the injection tube at 270°–280° C. 1,4-PBO easily underwent thermal decomposition by itself and the decomposition product was generated at the injection tube. Intrinsic viscosity of the drawn yarn obtained was 0.82 and the COOH was 20 g equivalents per $10^6$ g of the polymer. Thus, this was found to be not good.

COMPARATIVE EXAMPLE 2

The PET of intrinsic viscosity 0.90, COOH of 24 g equivalents per $10^6$ g of the polymer which was refined intermediately in the Example of the Application was solidified and made into chips. To this PET chips, powder of 1,3-PBO was added by 0.75 weight percent and mixed. After this, the extruder-type melt spinning machine was used to carry out the spinning and drawing by the same conditions as in the Example of Application. As the result, drawn yarn of intrinsic viscosity 0.88 and COOH of 18 g equivalents per $10^6$ g of the polymer was obtained.

With the drawn yarn which was obtained by repeating the same process except for not adding the powder of 1,3-PBO, the intrinsic viscosity was 0.80 and COOH was 40 g equivalents per $10^6$ g of the polymer.

This result shows that the process of solidifying the PET and mixing the bis-oxazoline followed by the remelting complicates the process. In addition, solidification of the PET and remelting causes decomposition of the PET, reducing the degree of polymerization and failing to reduce the COOH with good efficiency.

We claim:

1. In a method of making a heat-resistant polyester, said polyester consisting of an aromatic dicarboxylic acid and a glycol component having 2–6 carbon atoms by reducing the amount of carboxyl end groups in the polyester to below 15 g equivalents per $10^6$ g of polymer, the improvement comprising reacting said polyester in a molten state with from about 0.1 to about 5 weight percent of molten 2,2'-1,3-phenylene-bis(2-oxazoline), said molten polyester having and intrinsic viscosity of at least 0.50, and immediately forming said molten polyester into a shaped article, thereby eliminating decomposition due to remelting.

2. The method of claim 1 wherein the shaped article is selected from the group consisting of film and fiber.

* * * * *